United States Patent
Shah et al.

(10) Patent No.: US 10,387,097 B2
(45) Date of Patent: Aug. 20, 2019

(54) CART FOR USE IN PROVIDING SERVICE TO PASSENGERS IN A VEHICLE

(71) Applicant: PANASONIC AVIONICS CORPORATION, Lake Forest, CA (US)

(72) Inventors: Shrenik Shah, San Clemente, CA (US); Steven Bates, Mission Viejo, CA (US); Feng Jiang, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 118 days.

(21) Appl. No.: 15/667,425

(22) Filed: Aug. 2, 2017

(65) Prior Publication Data

US 2019/0042175 A1  Feb. 7, 2019

(51) Int. Cl.
*G06F 3/14* (2006.01)
*G08C 17/02* (2006.01)
(Continued)

(52) U.S. Cl.
CPC ............ *G06F 3/1423* (2013.01); *B62B 3/004* (2013.01); *B62B 3/10* (2013.01); *G06F 3/147* (2013.01); *G06Q 30/0265* (2013.01); *G06Q 30/0267* (2013.01); *G08C 17/02* (2013.01); *G09G 3/2092* (2013.01); *H04W 4/80* (2018.02); *B62B 5/0033* (2013.01); *G09G 3/344* (2013.01); *G09G 3/36* (2013.01); *G09G 2330/02* (2013.01); *G09G 2370/022* (2013.01); *G09G 2370/16* (2013.01);
(Continued)

(58) Field of Classification Search
CPC ... B62B 3/004; G06F 3/1423; G06Q 30/0265; G06Q 30/0267; H04W 74/0816

USPC .............................. 280/47.11, 47.34–47.371
See application file for complete search history.

(56) References Cited

U.S. PATENT DOCUMENTS 6,425,649 B2  7/2002  Kasuya
6,430,605 B2  8/2002  Hunter
(Continued)

FOREIGN PATENT DOCUMENTS

EP  2 930 105  10/2015

OTHER PUBLICATIONS

Alibaba.com, 10inch supermarket/mall shopping cart advertising screen,trolley digital display signage battery powered,supprt SD card,USB, Apr. 10, 2017.

*Primary Examiner* — Michael Pervan
(74) *Attorney, Agent, or Firm* — Brian Furrer

(57) ABSTRACT

A cart for providing service to passengers in a vehicle. The cart includes a housing having a storage volume with one or more openings to the storage volume, opposite housing sidewalls, and wheels connected to the bottom of the housing. The cart also includes a wireless communication module supported by the housing, with the wireless communication module configured to establish a data communications link in accordance with at least one wireless communication protocol. A data processor is supported by the housing and connected in communication with the wireless communication module with the data processor executing a control system, and the control system receiving information via the data communications link. Sidewalls of the housing support an electronic display connected in communication to the control system and displaying information in accordance with commands received from the control system.

19 Claims, 6 Drawing Sheets

(51) Int. Cl.
　　　*G09G 3/20*　　　(2006.01)
　　　*G06Q 30/02*　　(2012.01)
　　　*B62B 3/00*　　　(2006.01)
　　　*B62B 3/10*　　　(2006.01)
　　　*H04W 4/80*　　　(2018.01)
　　　*G06F 3/147*　　(2006.01)
　　　*H04W 74/08*　　(2009.01)
　　　*H04W 84/12*　　(2009.01)
　　　*G09G 3/36*　　　(2006.01)
　　　*G09G 3/34*　　　(2006.01)
　　　*B62B 5/00*　　　(2006.01)

(52) U.S. Cl.
　　　CPC ..... *G09G 2380/12* (2013.01); *H04W 74/0816* (2013.01); *H04W 84/12* (2013.01)

(56) References Cited

U.S. PATENT DOCUMENTS

| | | | |
|---|---|---|---|
| 7,370,867 B2* | 5/2008 | Olson | A47J 39/006 280/47.131 |
| 7,443,295 B2 | 10/2008 | Brice et al. | |
| 2008/0230603 A1* | 9/2008 | Stawar | B62B 3/1408 235/383 |
| 2008/0231431 A1* | 9/2008 | Stawar | B62B 3/1408 340/425.5 |
| 2008/0231432 A1* | 9/2008 | Stawar | B62B 3/1408 340/425.5 |
| 2010/0140890 A1* | 6/2010 | Boivin | B62B 3/003 280/47.34 |
| 2011/0215199 A1 | 9/2011 | Lee | |
| 2013/0264786 A1* | 10/2013 | Hannah | A47F 10/04 280/33.994 |
| 2016/0059875 A1* | 3/2016 | Segman | B62B 5/0063 701/24 |
| 2017/0003682 A1* | 1/2017 | Segman | G05D 1/0295 |

\* cited by examiner

CART FOR USE IN PROVIDING SERVICE TO PASSENGERS IN A VEHICLE

CROSS-REFERENCE TO RELATED APPLICATIONS

Not Applicable

STATEMENT RE: FEDERALLY SPONSORED RESEARCH

Not Applicable.

COPYRIGHT NOTICE

A portion of the disclosure includes material subject to copyright protection. The copyright owner has no objection to the facsimile reproduction by anyone of the patent disclosure as it appears in the Patent and Trademark Office patent file or records, but otherwise reserves all copyright rights whatsoever.

TECHNICAL FIELD

The present disclosure relates generally to carts, and more particularly to carts for use in providing service for passengers on commercial transport vehicles.

BACKGROUND

On vehicles used for commercial transport of passengers, vehicle crew frequently employ a cart to aid in providing service for passengers while the vehicle is in route to its destination. In particular, the cart is used to carry service items, such as beverages, snacks, and meals for passengers. The services items are stored in the cart in bins or shelves, and vehicle crew push the cart along aisles in the vehicle between columns of seats as each row of passengers is served. On larger aircraft, multiple carts are typically employed so that different sections of the vehicle may be serviced simultaneously. In addition, one cart may be used to provide beverages for passengers, while another cart is used to provide meals so that that passengers may be served more quickly.

While such carts are useful and reduce the workload for vehicle crew, the carts have not changed much in recent years. Hence, improvements are desired to enhance cart utility.

SUMMARY OF THE DISCLOSURE

In one aspect, the disclosure describes a cart for use in providing service to passengers in a vehicle. The cart includes a housing having a storage volume with at least one opening to the storage volume, and the housing including a bottom and a pair of opposite sidewalls. The cart also includes wheels connected to the bottom of the housing, and a wireless communication module supported by the housing. The wireless communication module is configured to establish a data communications link in accordance with at least one wireless communication protocol. The cart additionally includes a data processor supported by the housing and connected in communication with the wireless communication module. The data processor execute a control system in which the control system receives information via the data communications link.

The cart also includes an electronic display supported by each sidewall of the housing. Each electronic display is connected in communication to the control system and displays information in accordance with commands received from the control system. The cart includes an electrical power source electrically connected to the wireless communication module, the data processor, and electronic display and supplies electrical power thereto, either directly or indirectly.

In a further aspect, the control system receives advertising data via the data communications link, and commands the electronic displays to display information in accordance with the advertising data. In another further aspect, the cart includes a memory storing advertising data connected in communication with the data processor. The adverting data may have been communicated to the cart via the data communications link and stored in the memory, in which the control system executed by the data processor commands the electronic displays to display information in accordance with the advertising data. The advertising data may include information such as a menu of available meals, snacks, beverages and other items, prices, premium and request items available, and other information such as a service schedule, and attractions to visit at the arrival destination, including available services at the destination.

In another further aspect, the wireless communication module is configured to establish a data communications link in accordance with a media access control protocol known as Carrier Sense Multiple Access with Collision Avoidance based on IEEE 802.11 standards. The wireless communications module is also configured to establish a data communications link in accordance with short-range radio frequency communication protocol based on the International Organization for Standardization of radio frequency identification.

In yet a further aspect, at least one electronic display includes an electrophoretic ink. In a different further aspect, at least one electronic display includes a liquid crystal display. In yet a different further aspect, the electrical power source includes a rechargeable power source.

In another aspect, the disclosure describes a cart for use in providing service to passengers in a vehicle. The cart includes a housing having a storage volume with at least one opening to the storage volume, and the housing including a bottom and sidewalls. The cart includes wheels connected to the bottom of the housing, and a data processor supported by the housing in which the data processor executes a control system. The cart includes an electronic paper display supported by at least one sidewall of the housing, with the electronic paper display being connected in communication to the control system and displaying information in accordance with commands received from the control system. The cart includes an electrical power source electrically connected to the data processor and the electronic paper display and supplying electrical power thereto. In a more detailed aspect the electronic paper display includes an electrophoretic ink.

In a further aspect, the cart includes a memory storing advertising data connected in communication with the data processor in which the control system executed by the data processor commands the electronic display to display information in accordance with the advertising data. In a yet further aspect, the cart includes a non-volatile memory connected in communication with the data processor. In still another aspect, the cart further includes a wireless communication module supported in the housing. The wireless communication module is configured to establish a data communications link in accordance with one or more wireless communication protocols. In a more detailed aspect, at least one wireless communication protocol is in accordance with at least one of Bluetooth and NFC.

The vehicle includes an electrical system and galley. In an additional aspect, the electrical power source of the cart includes a rechargeable battery supported by the housing. The cart further includes a pair of electrical contacts configured to electrically connect to the vehicle electrical system when the cart is docked or stowed in the galley of the vehicle for convenient recharging when the cart is not in use.

In a different aspect, the disclosure describes a cart for use in providing service to passengers in a vehicle. The cart includes a housing having a storage volume, a bottom, sidewalls, and opposite ends. Each end includes a door moveable between an open position permitting access to the storage volume, and a closed position, closing off access to the storage volume from that end of the housing. The cart also includes wheels connected to the bottom of the housing, and an information processing system supported by the housing. The information processing system includes a data processor and memory in communication with one another. The data processor executes a control system in which the control system accesses data stored in the memory.

The cart includes an electronic display supported by at least one sidewall of the housing, with the electronic display connected in communication to the control system and displaying information in accordance with commands received from the control system. The cart further includes an electrical power source electrically connected to the data processor and electronic display and supplying electrical power thereto. In further aspects, the electronic display includes an electrophoretic ink, and the cart includes another electronic display supported by another sidewall of the housing.

In a still further aspect, the cart includes a wireless communication module supported in the housing in which the wireless communication module is configured to establish a data communications link in accordance with at least one wireless communication protocol. In a more detailed aspect, the wireless communication module is configured to establish a data communications link in accordance with a media access control protocol known as Carrier Sense Multiple Access with Collision Avoidance based on IEEE 802.11 standards, and a data communications link in accordance with short-range radio frequency communication protocol based on International Organization for Standardization radio frequency identification.

The vehicle includes an electrical system and galley. In a more detailed aspect, the electrical power source of the cart includes a rechargeable battery supported by the housing. Moreover, the cart includes electrical contacts configured to electrically connect to the vehicle electrical system when the cart is docked or stowed in the galley of the vehicle.

Other aspects and advantages will become apparent from the following description, taken in conjunction with the accompanying drawings.

BRIEF DESCRIPTION OF THE DRAWINGS

The various features of the present disclosure will now be described with reference to the drawings of the various aspects disclosed herein. In the drawings, the same components may have the same reference numerals. Note that the drawings are not intended to be to scale or show actual quantities of components or relative sizes. The illustrated aspects are intended to illustrate, but not to limit the present disclosure. The drawings include the following figures briefly described as follows.

DETAILED DESCRIPTION

As a preliminary note, the terms "component", "module", "system," and the like as used herein are intended to refer to a computer-related and/or information processing entity, either software-executing general or special purpose processor, hardware, firmware and/or a combination thereof. For example, a component may be, but is not limited to being, a process running on a hardware processor, a hardware processor, an object, an executable, a thread of execution, a program, and/or a computer. For example, a controller or control system may be implemented in software, hardware, and/or a combination thereof, and may include a group of two or more control systems working cooperatively.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

Figure 1:
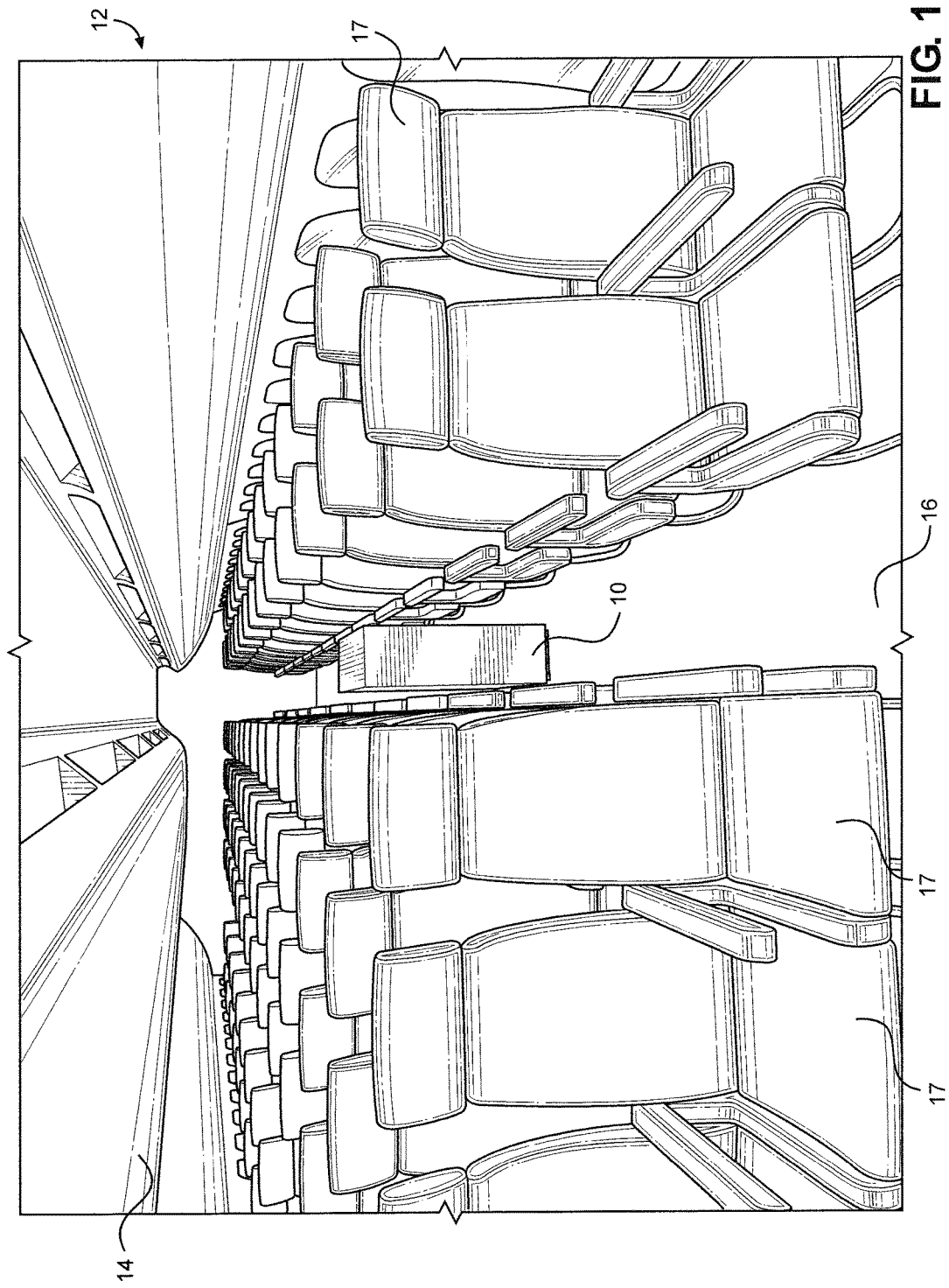
FIG. 1 schematically illustrates a perspective view of a portion of the passenger cabin of an airplane with a cart shown along an aisle between columns of seats.

In one aspect, the following disclosure describes a cart 10 for use in providing service to passengers in a vehicle 12 as schematically illustrated in FIG. 1. In particular, FIG. 1 illustrates a perspective view of a portion of the passenger cabin of an airplane 14, with the cart 10 positioned along an aisle 16 between columns of seats 17. While FIG. 1 illustrates the vehicle 12 as an airplane 14, the vehicle is not limited to an aircraft and may be of any type, such as a ship, train, ferry, bus, or other type of vehicle having an aisle 16 or other areas through which a cart 10 may move for providing service to passengers. The cart 10 may also be used in stationary environments, such as in a building, warehouse, dock, and other environments, and used to transport items from a stationary environment to a mobile environment.

Figure 2:
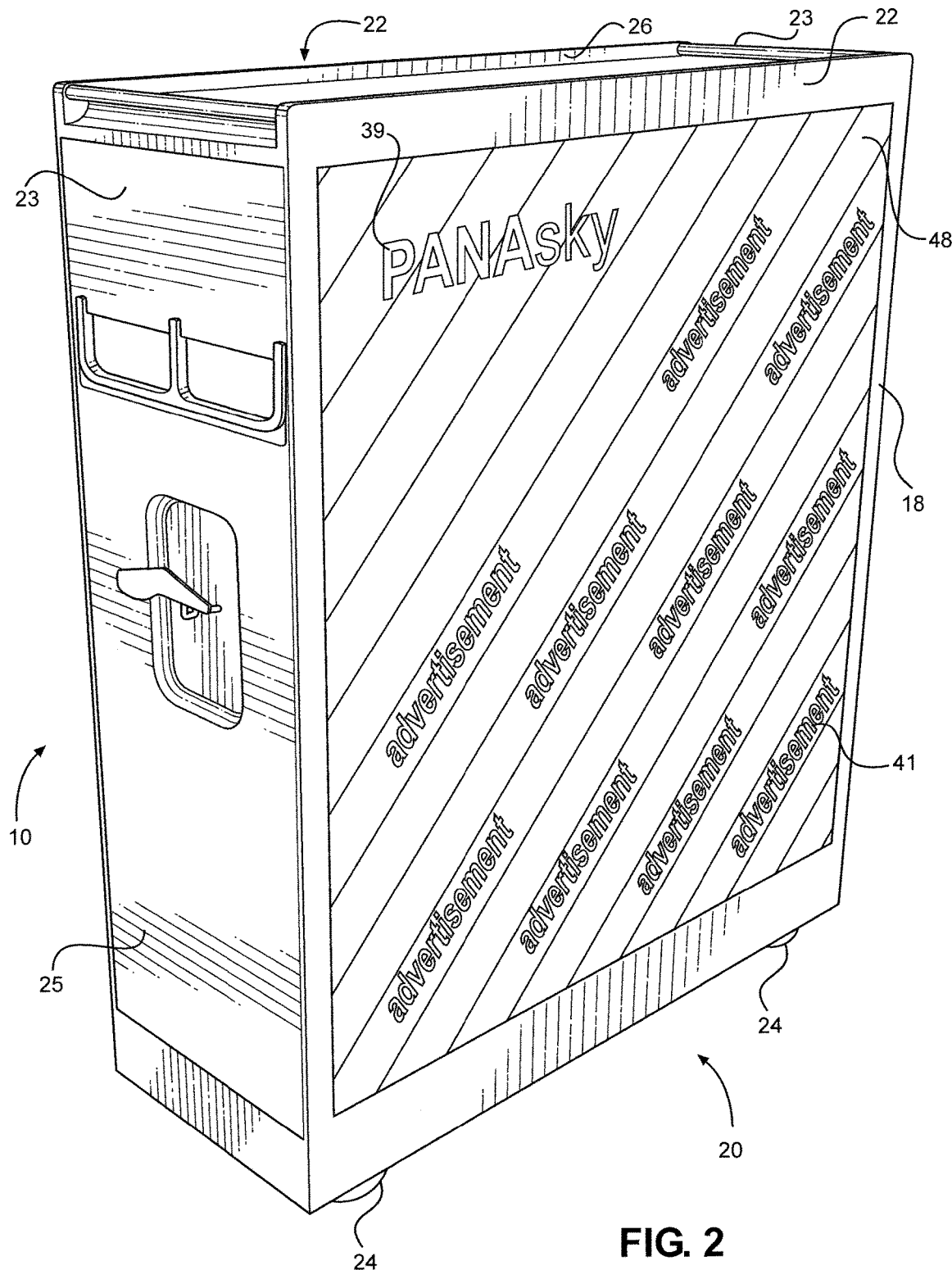
FIG. 2 illustrates a schematic perspective view of the cart of FIG. 1 removed from the vehicle, showing details of the cart.

FIG. 2 illustrates a view of the cart 10 removed from the vehicle 12. With continued reference to FIG. 2, the cart includes a housing 18 having a bottom 20, and a pair of opposite sidewalls 22. The shape of the housing 18 corresponding substantially to a rectangular parallelepiped. The rectangular parallelepiped shape of the housing 18 has a width, height, and length in which the width is the smallest of the foregoing three dimensions. The width is of a size sufficiently narrow to enable the cart 10 to be pushed along an aisle of most passenger transport vehicles. For aircraft used for commercial passenger transport, the aisle width ranges from 40 cm to 70 cm, depending on the class of service and the density of the seating. Section 25.815 of Part 25 of Federal Aviation Regulations requires an aisle width of at least 15 inches (38.1 cm) for aircraft having a passenger seating capacity of 20 or more.

The length of the rectangular parallelepiped shape of the housing 18 is of a dimension for providing sufficient workspace for flight crew members to efficiently serve seated passengers. Simultaneously, the length is limited to facilitate maneuvering the cart 10 from stowage in a galley in the vehicle 12, along the aisle or aisles 16 of the vehicle, and back to the cart stowage location. The housing 18 includes opposite ends 23, and the housing length from one end 23 of the housing 18 to the other end 23 horizontally along the aisle 16 of the vehicle 12 is typically from two to three times the housing width.

The cart 10 includes wheels 24 connected to the bottom of the housing 18. The wheels 24 support the housing 18 on the floor of the vehicle 12 for rolling the cart 10 along an aisle 16. The wheels 24 include brakes operated by pedals (not shown) connected to the bottom 20 of the housing for locking the wheels 24 and preventing the cart 20 from rolling. The wheels 24 typically support the bottom 20 of the housing 18 from 100 to 150 cm above the vehicle floor, and more typically in a range from 110 cm to 130 cm. The height of the housing 18 from the bottom 20 to the top 26 of the housing, plus the distance the wheels 24 support the housing bottom 20 above the floor, places the housing top 26 at a height comfortable for most crew members as a work surface. The housing height, measured from the housing bottom 20 to the housing top 26, is usually within a range from 800 cm to 1000 cm, and more typically around the midpoint of the foregoing range. When the height added by the wheels 24 is included, this places the top 26 of the housing 18 in a range from 900 cm to 1150 cm above the vehicle floor.

Figure 3:
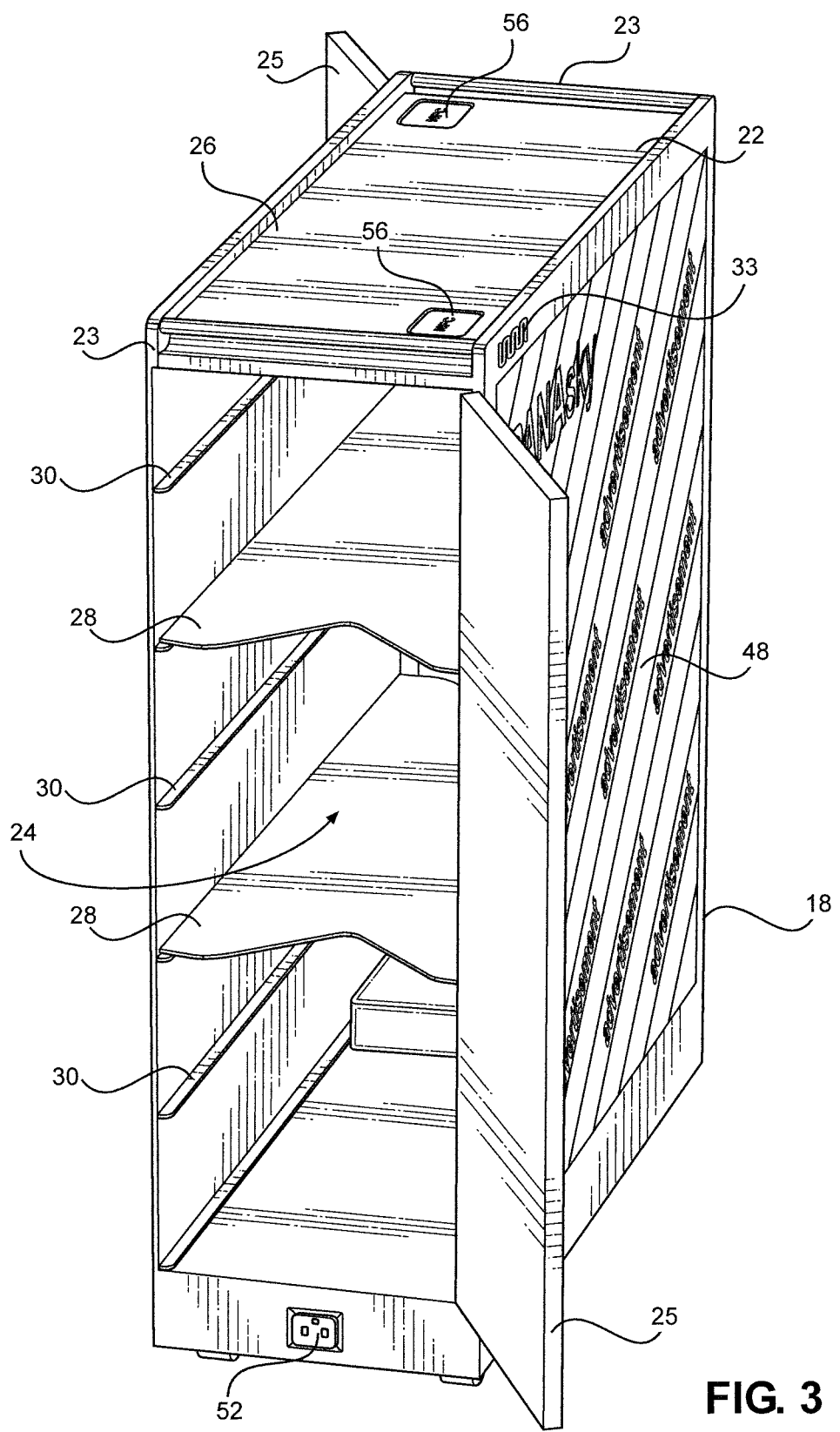
FIG. 3 schematically illustrates the cart of FIG. 2, with a door at each end of the cart at an open position and permitting access to a storage volume in a housing of the cart.

Returning to FIG. 1, the cart 10 is pushed or directed along the aisle 16 of the vehicle 12, lengthwise. That is, with each sidewall 22 of the cart 10 facing towards the rows of seats 18 on opposite sides of the cart 10. As can be seen in FIG. 3, the housing 18 includes a storage volume 24. The storage volume 24 is disposed above the bottom 20 of the housing 18, and between the sidewalls 22. The storage volume 24 may include shelves 28 for dividing the storage volume 24 into smaller sections or volumes for efficient storage of items, such as meal trays, beverages, snacks, and/or other service items. Preferably the shelves 28 are adjustable via a plurality of spaced apart shelf supports 30 disposed along the interior of the sidewalls 22 in the storage volume 24.

Figure 4:
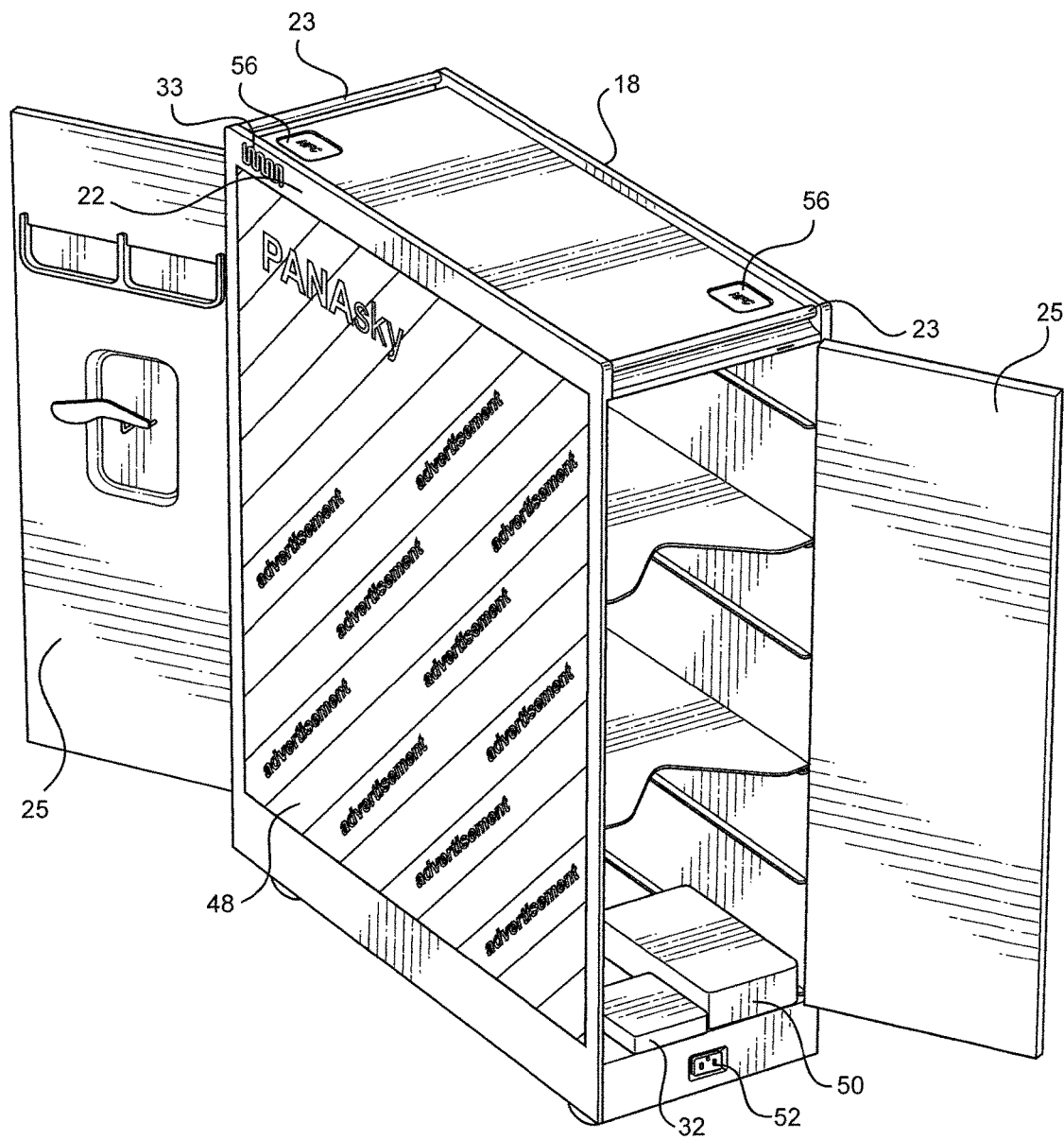
FIG. 4 schematically illustrates the cart of FIG. 3 looking towards the other end of the cart to more clearly show a battery supported by the housing.

Each end 23 of the housing 18 includes a door 25 moveable between an open position permitting access to the storage volume 24 and a closed position, closing off access to the storage volume from that end of the housing. FIG. 2 illustrates each door 25 in the closed position. In comparison, FIG. 3 illustrates each door 25 in the open position. FIG. 4 schematically illustrates a perspective view of the cart 10 towards the other end 23 of the cart 10, with both doors 25 in the open position.

Figure 5:
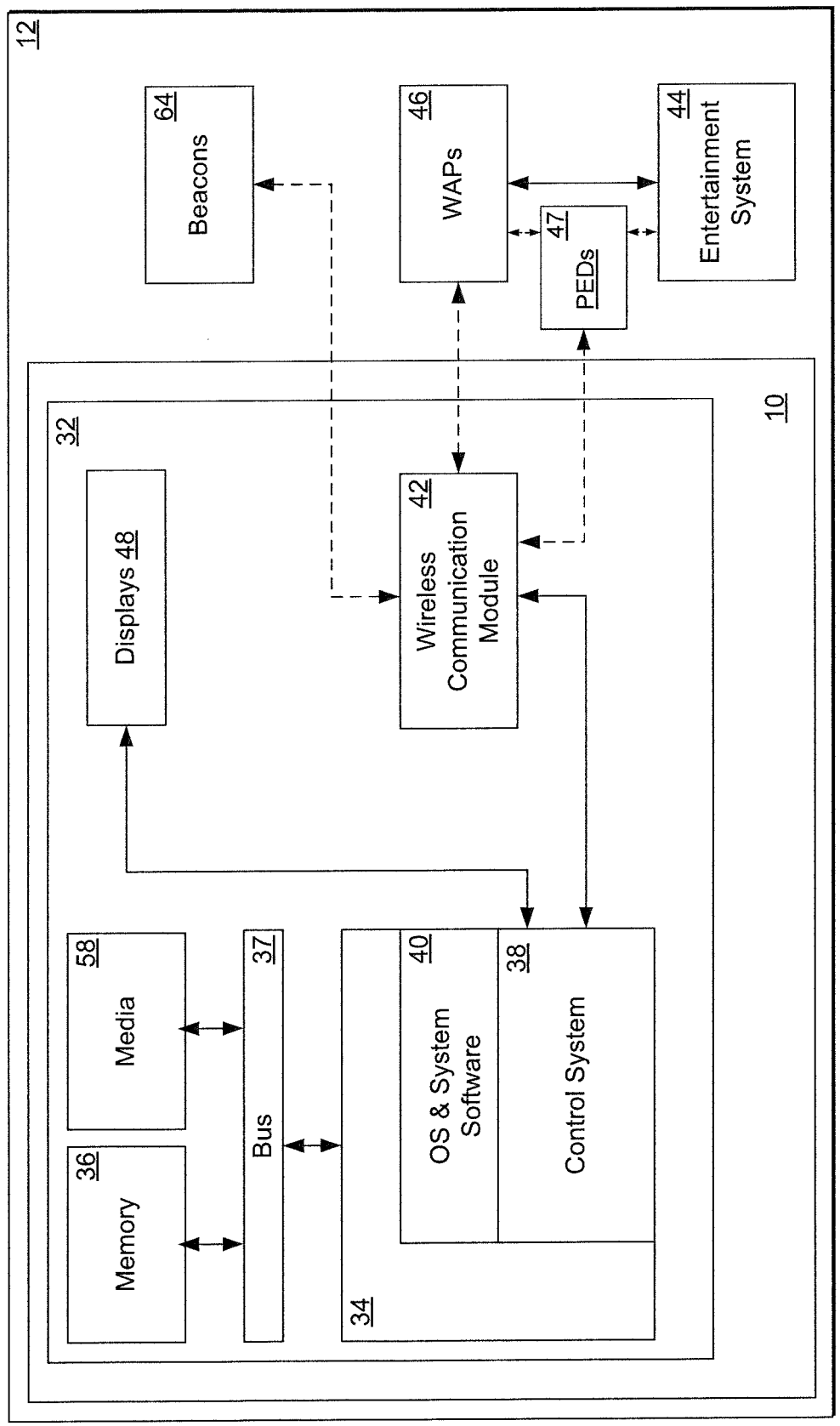
FIG. 5 schematically illustrates an information processing system of the cart and communication with components of the vehicle.

The cart 10 includes an information processing system 32. The information processing system 32 is supported by the cart housing 18. FIG. 5 illustrates a schematic diagram of the information processing system 32. As shown, the information processing system 32 includes a data processor 34 and memory 36 in communication with one another. In particular, the communication is via a bus 37. The data processor 34 executes a control system 38 in which the control system accesses data stored in the memory 36. The data processor 34 also executes an operating system and system software 40. The data processor 34 is preferably a low power type, such as an ARM processor, but may be other types as well, such as an Intel or AMD type processor, preferably a type intended for low power or mobile use, and may comprise one or processors for parallel processing, and/or a GPU in communication with the data processor.

The information processing system 32 includes a wireless communication module 42 supported by the housing 18. The wireless communication module 42 is configured to establish a wireless data communications link in accordance with at least one wireless communication protocol, for example, a media access control protocol known as Carrier Sense Multiple Access with Collision Avoidance based on IEEE 802.11 standards, commonly known as Wi-Fi. Another example is a short-range radio frequency communication protocol based on the International Organization for Standardization of radio frequency identification (RFID), including near field communication (NFC). Yet others examples include Bluetooth and cellular communication protocols. Still other examples include Lutron integration, Zigbee, Z-Wave, and Kidde protocols.

The wireless communication module 42 is able to establish a wireless data link in accordance with one or more of the foregoing protocols, and most preferably at least Wi-Fi. In this regard, vehicles 12 used for commercial public transport frequently include an entertainment system 44. Such entertainment systems 44 often include wireless access points (WAPs) 46, permitting passengers to use personal electronic devices (PEDs) 47 to establish communicate with the entertainment system 44 via Wi-Fi. Many entertainment systems include a selection of content, such as films and audio program that passengers can consume on their PEDs 47. The data processor 34 of the information processing system 32 is in communication with the wireless communication module 42, including the control system 38 executed by the data processor 34, and receives information via the wireless data communication link.

The cart 10 also includes an electronic display 48 supported by each sidewall 22 of the housing 18. Each electronic display 48 is connected in communication to the control system 38. Each electronic display 48 displays information in accordance with commands received from the control system 38. The information may be a menu of service items available, such as meal, snack and/or beverage types, brand information, and/or advertising, such as premium items available, and/or other information. Each electronic display 48 faces outward from its respective sidewall 22 of the cart 10 toward the passenger seats 17. The passengers are therefore able to view the information displayed by the electronic displays 48 while waiting for crew personnel to provide service from the cart 10.

The electronic displays 48 may be any type of conventional display that is lightweight and power efficient, such as LCDs, OLEDS, or electronic paper display types. Electronic paper are advantageous in that the displays are lightweight, low power, and can be read under bright light conditions because the electronic paper displays reflect light similar to how paper reflects light. Many electronic paper displays hold static text and images indefinitely even in the absence of electricity, and typically include electrophoretic ink. Further, electronic paper displays can display colors in addition to black and white. Electronic paper displays are available from E Ink Corporation of Billerica, Mass. in the United States.

The cart 10 includes an electrical power source 50 connected to the information processing system 32, which supplies power to the data processor 34 and wireless communication module 42. The electrical power source 50 also supplies power to the electronic displays 48. The electrical power source 50 preferably comprises a rechargeable battery carried by the cart 10. The desirable power output and capacity characteristics may be achieved with a lithium-ion type battery, such as lithium cobalt, lithium iron phosphate, lithium nickel cobalt, lithium polymer or other lithium type battery. Due to higher chemical and thermal stability, lithium iron phosphate may be preferred for applications where safety is of paramount concern, such as in aviation, or lithium nickel cobalt aluminum oxide in which the aluminum provides greater chemical stability. Lithium-polymer batteries may be shaped to correspond to the space available in the cart. Lithium batteries for aviation applications are available from Sanyo Electric Co. Ltd. of Sumoto City, Japan, in which Sanyo is a subsidiary of Panasonic Corporation. A possible alternative to lithium batteries is a fuel cell or cells. In either case, sufficient energy to power the various components of the cart 10, is preferable for at least one hour, and more preferably, a minimum of three hours.

As the battery 50 is preferably rechargeable, the cart 10 may include a charging circuit connected thereto with a detachable connection to the main electrical system of the vehicle 14 for convenient recharging of the battery 50. In particular, the cart 10 may be provided with a docking station in the vehicle 12 in which an electrical connection is established between the vehicle electrical system and the battery 50 when the cart 10 is docked or stowed. In this configuration, the charging circuit is preferably included with the dock to reduce the weight of the cart 10 and provide more storage space for service items. The cart 10 includes a plug or port 52 at the base of the housing 18 on each end of the housing. When the cart 10 is docked or stowed in the vehicle, the port 52 electrically connects or mates with a corresponding port connected to the vehicle electrical system. Hence, the battery 50 therefore charges when the cart 10 is docked or stowed, such as in the galley of a vehicle. The plug 52 is provided at both ends of the cart 10 so that either end of the cart may be docked or stowed for charging. Alternatively, the charging circuit may be included with the cart 10 and provided with a cord for connection to an electrical outlet of the vehicle 14.

As noted above, many electronic paper displays hold static text and images indefinitely even in the absence of electricity. This is advantageous in the event the battery 50 becomes discharged during use of the cart. In particular, such an electronic display can maintain the display of static text and images despite the depleted condition of the battery 50 until the battery can be recharged or replaced.

The battery 50 is preferably disposed near the bottom of the cart 20 to lower the cart's center of gravity and help reduce the risk of the cart tipping over. However, the battery 20 may be placed in other locations, depending on space requirements, and size and weight of the cart 10 and components thereof, including the battery. The information processing system 32 has been illustrated disposed near the bottom 20 of the cart 10. However, the information processing system 32 is generally a lighter weight component and may be placed at other locations. As information processing systems tend to generate heat, the information processing system 32 may be disposed near the top 26 of the cart 10 for a cart intended to provide chilled service items, such as canned beverages, desserts, ice cream, etc. If the wireless communication module 42 is placed near the bottom 20 of the cart 10, preferably it is connected in communication to one or more antennas 33 near the top 26 of the cart for improved signal reception.

As illustrated in FIGS. 3 and 4, at least NFC antennas 56 are placed on or near the top 26 of the cart 10 for convenient use by vehicle crew members. In this regard, crew members may accepts via NFC for premium service items. The NFC antennas 56 are provided proximate opposite ends of the cart so that crew members on opposite sides of the cart have convenient access to an NFC antenna. The NFC antennas also act as RFID readers such that the cart can track and monitor items having RFID tags. Alternatively, the NFC antennas 56 may be placed on the sidewalls 22 of the housing 18, near the upper corners the sidewalls for convenient access by both seated passengers and crew. More particularly, a seated passenger may easily reach an NFC antenna 56 located on the side of the housing 18, while the NFC nevertheless is positioned sufficiently high on a sidewall that it can also be conveniently reached by a standing crew member. In another configuration, the NFC antennas 56 may be placed on both the top 26 and sidewalls 22 of the cart 10 for even more convenient access.

The payment information is communicated to the control system 38. Preferably the wireless communication module 42 includes WiFi capability, in which the control system 38 encrypts the payment information and communicates the information to the vehicle entertainment system 44 for verification by communicating the information to a ground server. Alternatively, the wireless communication module 42 may have cellular capability, in which verification of payment information may proceed via cellular communication, or as a backup if there is an interruption in Internet connectivity.

As previously described, the information processing system 32 includes a memory 36 connected in communication with the data processor 34 via a bus 37. The data processor 34 executes the control system 38 in which the control system accesses data stored in the memory 36. The memory 36 may be SDRAM, NVRAM, a combination thereof, or other type. The cart 10 also includes storage media 58 connected to the data processor 34 for non-volatile storage of data when the data processor 64 is powered down and power is not available to maintain memory in RAM. The storage media 58 may be flash memory, an SSD, hard disk drive, or other type of media for non-volatile storage of data. A ROM or EEPROM may be included for non-volatile data storage as well, either alone or in combination with other non-volatile storage media.

Figure 6:
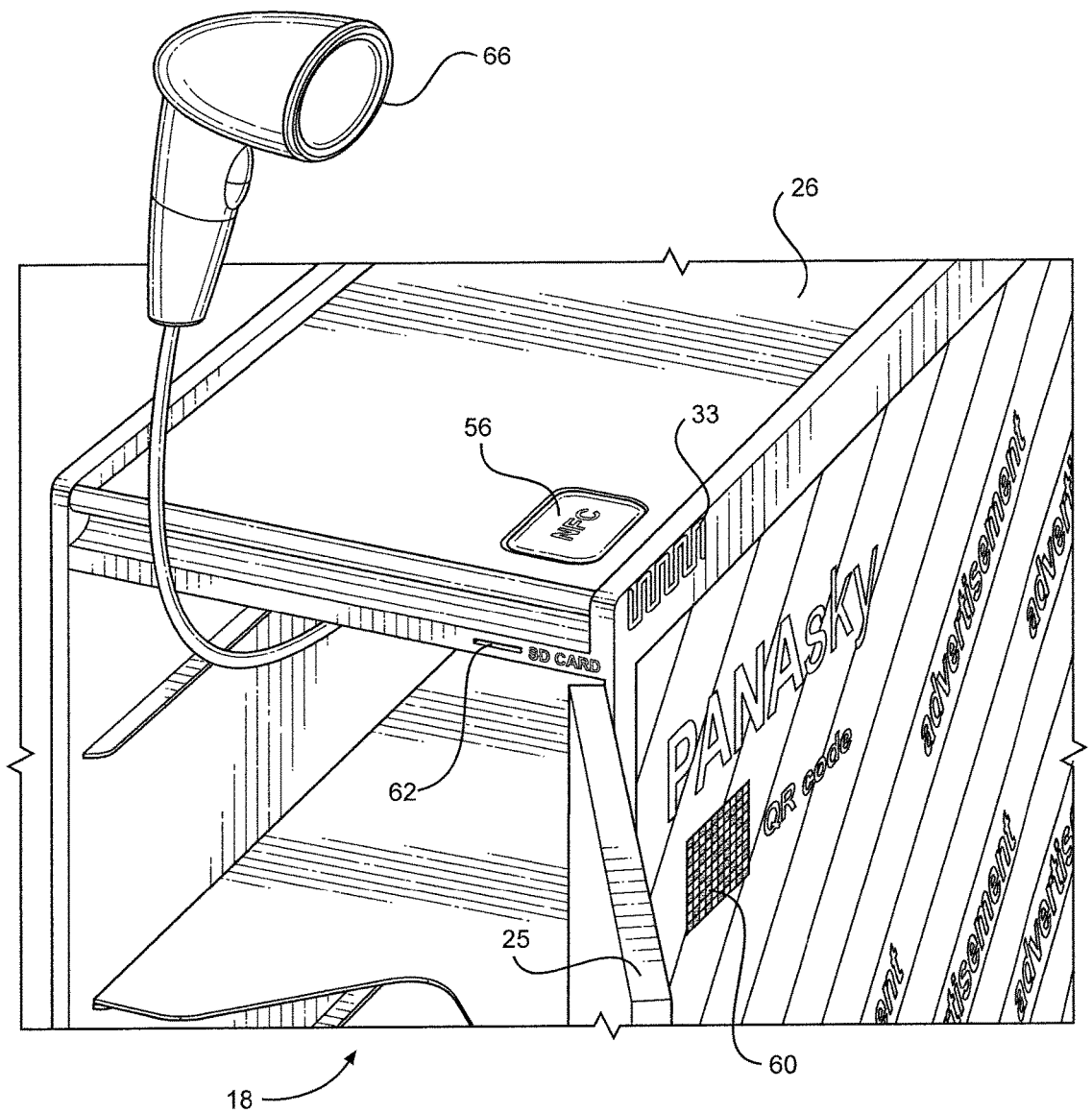
FIG. 6 schematically illustrates an enlarged view of a portion of the cart from FIG. 3, and illustrates an electronic display showing a QR code.

Referring to FIG. 6, the storage media 58 may be a compact flash, secure digital memory card (SD card), other removeable type insertable into a memory card reader 62. The memory card reader 62 is in communication with the bus 37 for exchanging data between the data processor 34 and the media 58. For greater security, the memory card reader may be disposed inside the cart housing 18 so that it is only accessible after one of the doors 25 of the cart are opened. Alternatively or in addition to a card reader 62, USB ports may be provided for connection of media in the form of USB drives.

The memory 25 stores advertising data in which the control system executed by the data processor commands the electronic displays to display information in accordance with the advertising data. The advertising data includes menus, prices, travel information, graphics and text, and itinerary information for the vehicle. The information may include public address messages as well. The advertising data may be communicated to the cart 10 via the wireless communication module 42 thereof and stored in the memory 36 by the control system 38 executed by the data processor 34.

Entertainment systems 44 on commercial transport vehicles typically have content that is refreshed periodically. The advertising data may be communicated from the entertainment system 44 via a WAP 46 in communication with the cart wireless communication module 42 (the dotted line in FIG. 5 indicates a wireless connection). Alternatively, the advertising data may be provided via a memory card inserted into the card reader 62, read from the media 58, and communicated to the control system 38. In a configuration in which the advertising data is provided via media 58, a wireless communication module 42 is not necessary for communicating advertising data to the cart 10 as it may be provided on removeable media 58.

With continued reference to FIG. 6, the control system 38 commands the electronic displays 48 to show QR codes (quick response codes) 60. In particular, advertising data may include a web address or link, which is displayed as a QR code 60 readable by the camera on a PED 47. A passenger may use their PED 47 to read the QR code 60 and be taken to a web site with more information about the subject of an advertisement or an online ordering page for an advertised service or item. The QR code 60 may be a link to a web page hosted by a server of the vehicle entertainment system 44, listing services and items available aboard the vehicle 12. The web address or link may be displayed in alphanumeric format as well for passengers that prefer to type the web address/link.

The QR codes 60 may further be provided as a payment option for passengers. A passenger uses their PED 47 to read the QR code 60, such as the amount due for a service item in which the PED 47 uses the information read from the QR code to communicate payment information to the vehicle entertainment system 44 via a WAP 46 or directly with the wireless communication module 42 of the cart 10. In an alternative configuration, the cart 10 includes an optical scanner 66 for reading QR codes on PEDs 47 for receiving payment information from passengers other information, such as information from a printed code, for instance ticket information or a coupon. In another configuration, an optical sensor 66 is mounted to the top 26 or sidewalls 22 of the cart housing 18 in which the PED 47 or material bearing the code may be held in front of the sensor for reading the code.

In at least one other configuration, the control system 38 determines the language or languages in which to display information on the displays 48 based on departure origin and destination of the vehicle 12. For instance, if the vehicle 12 is an aircraft departing Paris, France, and arriving in Munich, Germany, it will display information in French and German versions. Preferably, the travel itinerary is provided to the cart 10 along with advertisement data by communication with the vehicle entertainment system 12. Advertising may be automatically selected based on the destination of the vehicle, such as attractions to visit at the destination and available services at the destination. The vehicle entertainment system 10 may also communicate public address messages to the cart 10 to show on the electronic displays 48. For example, if turbulence is encountered during service and passengers are commanded to return to their seats and fasten seat belts, the cart 10 may show a corresponding message. Alternatively, a public address may identify points of interest to passengers as the vehicle 12 is passing nearby, such as mountains, lakes, rivers, or other sites.

The wireless communication module 42 may also include Bluetooth capability for communication with location beacons 64 in the vehicle 12. For example, the vehicle 12 may include beacons 64 identifying different classes of service with the vehicle with different service items available for each class. In this configuration, the cart control system 38 commands the displays 48 to display information in accordance with the determined cart location. Hence, if the control system 38 determines the cart 10 is located in premium class seating, the control system 38 commands the display 48 to display the premium class menu and/or other information pertaining to that section of the vehicle 12. Similarly, if the control system 38 determines the cart 10 is located in economy class based on communication with beacons 64, the control system 38 commands the displays 48 to control information for economy class services, such as menus and items for purchase.

Vehicle crew may use the cart 10 to display public address messages by using a crew personal electronic device to send commands to the cart control system 38 via the wireless data communication module 42. For example, if the menu includes two choices for a meal and of the choices is no longer available, a vehicle crew person could modify the menu. Lost and found messages could be posted, such as an item left in the lavatory. The crew may communicate directly with the cart 10 or indirectly via the vehicle entertainment system 44. In this regard, instead of using a crew personal electronic device to command the cart 10, a crew management terminal of the entertainment system may be used to communicate a command or message to the cart 10.

Various changes and modifications can be made as will be recognized by those of ordinary skill in the art. While the cart 10 has been described for use with a vehicle 12, it could be used for stationary applications as well, such as providing services in a building, mall, or outdoor location. In addition, the cart could be to transport service items from a stationary environment, for example, from a storage or inventory area of a building or terminal to the vehicle, and vice versa, such as offloading unused inventory. The cart 10 may be provided with cameras and other sensors in communication with the control system 38 for navigation, along with motorized wheels 24 for automated delivery of items. For example, while the vehicle 12 is at a terminal, the cart 10 could be programmed to automatically proceed from an inventory or food storage area in the terminal, to the vehicle, and carry aboard supplies for the vehicle for an upcoming departure. Instead of wheels 24, the cart could be provided with treads or feet, or both wheels and feet.

The cart 10 has been illustrated with doors 25 disposed on the ends of the cart. However, doors 25 could be provided at other locations, for example, on the upper surface of the cart for convenient access to a containers in the cart having items such as ice and/or other items. Electronic displays 48 have been described on the sidewalls 22 of the cart. An additional electronic display or displays could be added, such as on the upper surface of the cart 10 for use by crew personnel. A keyboard and/or touch screen could be added for crew to quickly change information displayed by the electronic displays 48, such as deleting items from a menu if items are no longer available. As previously mentioned, the NFC antennas 56 may be placed on the sidewalls 22 of the housing 18, instead of the upper surface, or other locations, or both on the upper surface and sidewalls. Instead of QR codes 60, the control system 38 could command the electronic displays 48 to show bar codes or both QR and bar codes and/or other codes readable by an optical sensor on a PED 47.

As changes can made, the foregoing disclosure and examples described therein are to be considered as illustrative and not restrictive and the invention is not to be limited to the details given herein, but may be modified within the scope and equivalence of the appended claims.

The invention claimed is:

1. A cart for use in providing service to passengers in a vehicle, the cart comprising:
    a housing including a storage volume and at least one opening to the storage volume, the housing including a bottom and a pair of opposite sidewalls;
    wheels connected to the bottom of the housing;
    a wireless communication module supported by the housing, the wireless communication module configured to establish a data communication link in accordance with at least one wireless communication protocol;
    a data processor supported by the housing and connected in communication with the wireless communication module, the data processor executing a control system, the control system receiving information via the data communications link;
    an electronic display supported by each sidewall of the housing, each electronic display being connected in communication to the control system and displaying information in accordance with commands received from the control system; and
    an electrical power source electrically connected to the wireless communication module, the data processor, and each electronic display and supplying electrical power thereto.

2. The cart of claim 1, further comprising a memory storing data connected in communication with the data processor in which the control system executed by the data processor commands the electronic displays to display information in accordance with the data stored in the memory.

3. The cart of claim 1, wherein the wireless communication module is configured to establish a data communications link in accordance with a media access control protocol known as Carrier Sense Multiple Access with Collision Avoidance based on IEEE 802.11 standards, and a data communications link in accordance with short-range radio frequency communication protocol based on the International Organization for Standardization of radio frequency identification.

4. The cart of claim 1 wherein the control system receives advertising data via the data communications link, and commands the electronic displays to display information in accordance with the advertising data.

5. The cart of claim 4, wherein at least one electronic display comprises an electrophoretic ink.

6. The cart of claim 1, wherein at least one electronic display comprising a liquid crystal display.

7. The cart of claim 1, wherein the electrical power source comprises a rechargeable battery.

8. A cart for use in providing service to passengers in a vehicle, the cart comprising:
    a housing including a storage volume and at least one opening to the storage volume, the housing including a bottom and sidewalls;
    wheels connected to the bottom of the housing;
    a data processor supported by the housing and in which the data processor executes a control system;
    an electronic paper display supported by at least one sidewall of the housing, and another electronic paper display supported by at least one other sidewall of the housing, each electronic paper display being connected in communication to the control system and displaying information in accordance with commands received from the control system; and
    an electrical power source electrically connected to the data processor and the electronic paper display and supplying electrical power thereto.

9. The cart of claim 8, wherein each electronic paper display includes an electrophoretic ink.

10. The cart of claim 8, further comprising memory storing advertising data connected in communication with the data processor in which the control system executed by the data processor commands each electronic display to display information in accordance with the advertising data.

11. The cart of claim 10, further comprising a non-volatile memory connected in communication with the data processor.

12. The cart of claim 8, further comprising a wireless communication module supported in the housing, the wireless communication module configured to establish a data communications link in accordance with at least one wireless communication protocol.

13. The cart of claim 12, wherein said at least one wireless communication protocol in accordance with at least one of Bluetooth and NEC.

14. The cart of claim 8, wherein the vehicle includes an electrical system and galley, and the electrical power source comprises a rechargeable battery supported by the housing, the cart further comprising a pair of electrical contacts configured to electrically connect to the vehicle electrical system when the cart is stowed in the galley of the vehicle.

15. A cart for use in providing a service to passengers in a vehicle, the cart comprising:
    a housing including a storage volume, a bottom, sidewalls, and opposite ends, each end including a door moveable between an open position permitting access to the storage volume, and a closed position, closing off access to the storage volume from that end of the housing;
    wheels connected to the bottom of the housing;
    an information processing system supported by the housing; the information processing system including a data processor and memory in communication with one another, the data processor executing a control system in which the control system accesses data stored in the memory;
    an electronic display supported by at least one sidewall and another electronic display supported by another sidewall of the housing, each electronic display being connected in communication to the control system and displaying information in accordance with commands received from the control system; and an electrical power source electrically connected to data processor, and each electronic display and supplying electrical power thereto.

16. The cart of claim 15, wherein at least one of the electronic displays comprises an electrophoretic ink.

17. The cart of claim 15, further comprising a wireless communication module supported in the housing, the wireless communication module configured to establish a data communications link in accordance with at least one wireless communication protocol.

18. The cart of claim 17, wherein the wireless communication module is configured to establish a data communications link in accordance with a media access control protocol known as Carrier Sense Multiple Access with Collision Avoidance based on IEEE 802.11 standards, and a data communications link in accordance with short-range frequency communications protocol based on International Organization for Standardization radio frequency identification.

19. The cart of claim 15, wherein the vehicle includes an electrical system and galley, and the electrical power source comprises a rechargeable battery supported by the housing, the cart further comprising electrical contacts configured to electrically connect to the vehicle electrical system when the cart is stowed in the galley of the vehicle.

* * * * *